United States Patent [19]

Strom et al.

[11] Patent Number: 5,576,524

[45] Date of Patent: Nov. 19, 1996

[54] METHOD AND APPARATUS FOR ALIGNING TURN SIGNAL SWITCH

[75] Inventors: Peter H. Strom, Big Rapids; David Bull, Hersey, both of Mich.

[73] Assignee: Nartron Corporation, Reed City, Mich.

[21] Appl. No.: 316,774

[22] Filed: Oct. 3, 1994

[51] Int. Cl.⁶ .................................................. H01H 3/16
[52] U.S. Cl. ........................... 200/61.27; 200/61.34; 200/61.54
[58] Field of Search ........................ 200/61.27, 61.28, 200/61.29, 61.3, 61.31, 61.32, 61.33, 61.34, 61.35, 61.36, 61.37, 61.38, 61.54

[56] References Cited

U.S. PATENT DOCUMENTS

| | | | |
|---|---|---|---|
| 3,809,833 | 5/1974 | Miller et al. | 200/61.27 |
| 4,013,850 | 3/1977 | Bull | 200/61.27 |
| 4,081,634 | 3/1978 | Bull | 200/61.27 |
| 4,218,595 | 8/1980 | Honjo | 200/61.54 |
| 4,297,549 | 10/1981 | Tregurtha et al. | 200/61.27 |
| 4,404,438 | 9/1983 | Honjo | 200/61.54 |
| 4,423,295 | 12/1983 | Contato | 200/61.27 |
| 5,021,617 | 6/1991 | DeShong | 200/61.27 |

*Primary Examiner*—Michael L. Gellner
*Assistant Examiner*—Michael A. Friedhofer
*Attorney, Agent, or Firm*—Brooks & Kushman P.C.

[57] ABSTRACT

A method and apparatus for aligning a turn signal switch housing with respect to a cancellation pin support bracket includes installation of the bracket on a steering wheel hub. The bracket includes a gauge pin formed in one piece with the steering wheel hub ring bracket. The ring bracket supports cancellation pins to extend at radially displaced positions for registering with the actuator of the turn signal switch assembly. The turn signal switch assembly is supported upon the steering column housing by a mount for adjusting the axial position of the housing. In the preferred embodiment, the gauge pin is carried by the hub-mounted ring bracket and is positioned for engagement with an engagement surface on the turn signal housing adjacent the actuator to be operated by the cancellation pin. The switch housing is slid axially along the steering column housing while supported in a mounting bracket. The fasteners are then tightened to secure the turn signal housing to the steering column housing in a position necessary to rotate the cancellation pin in an arcuate path that intersects with the actuator on the turn signal switch housing.

12 Claims, 3 Drawing Sheets

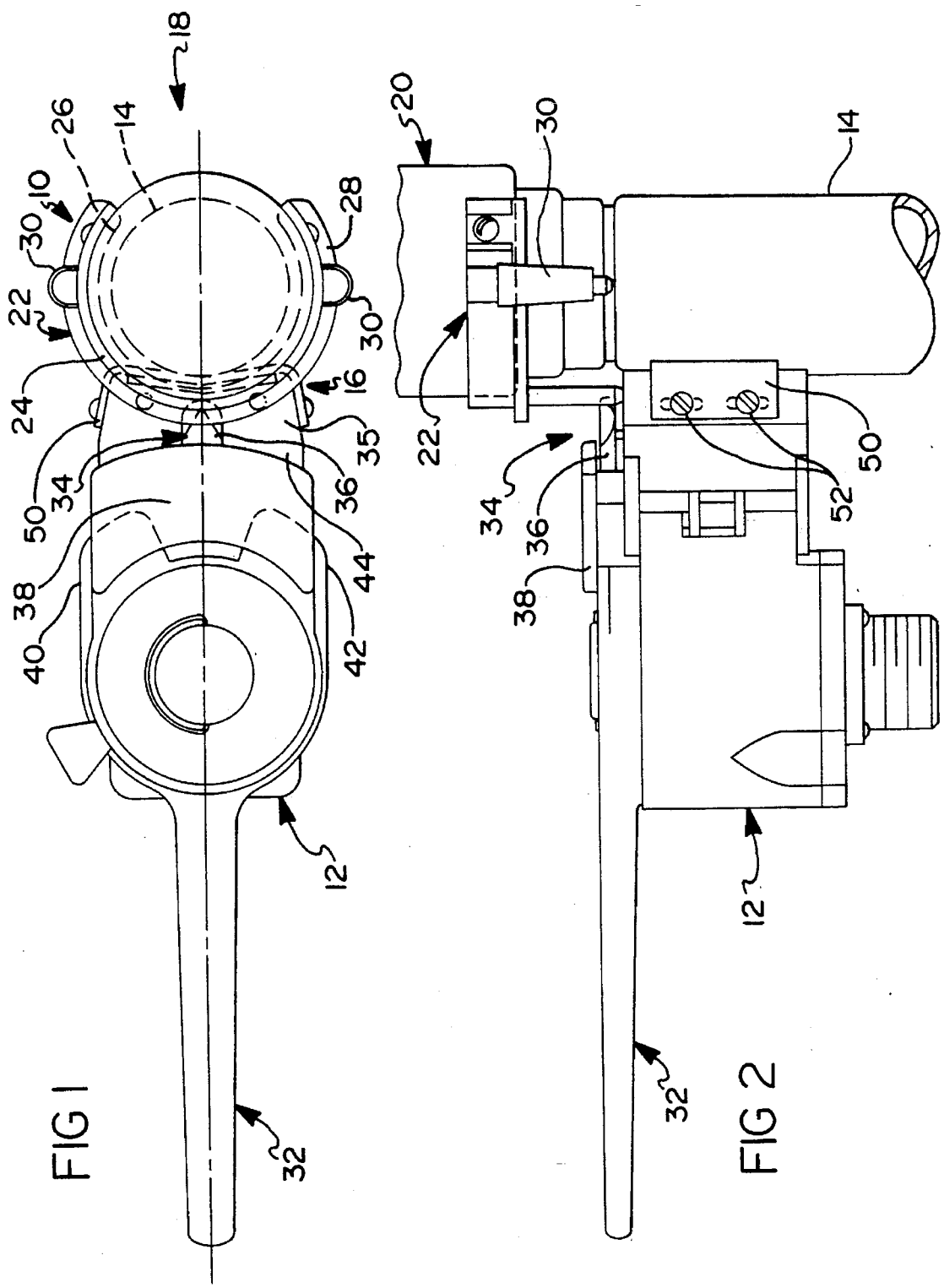

FIG 3
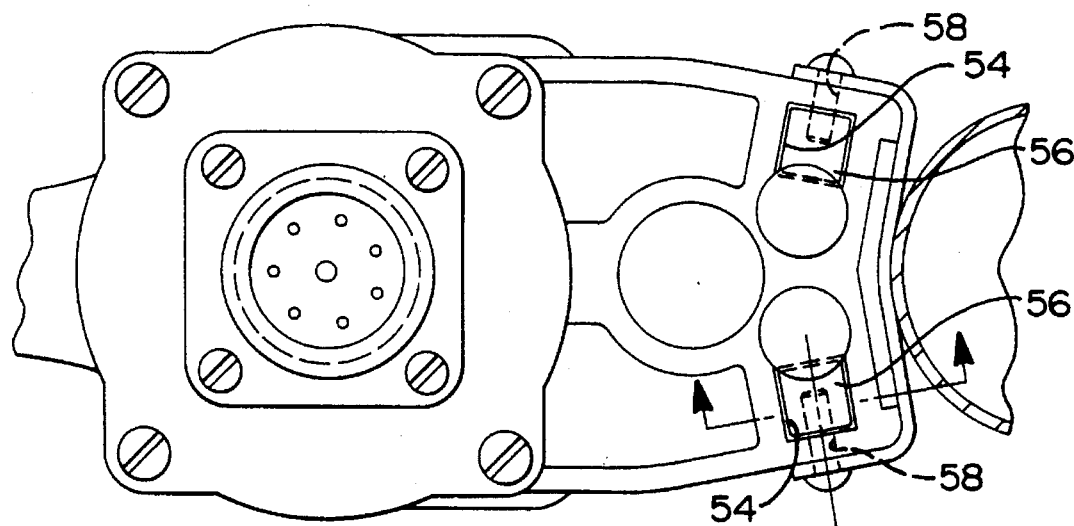
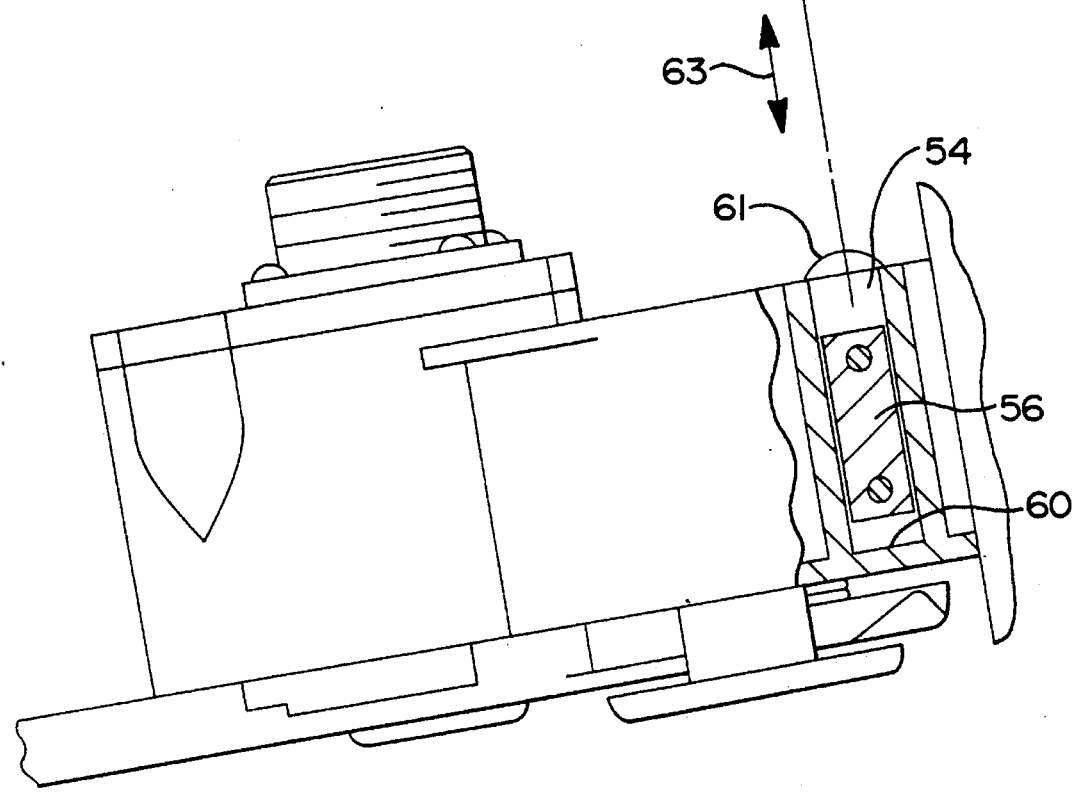
FIG 4

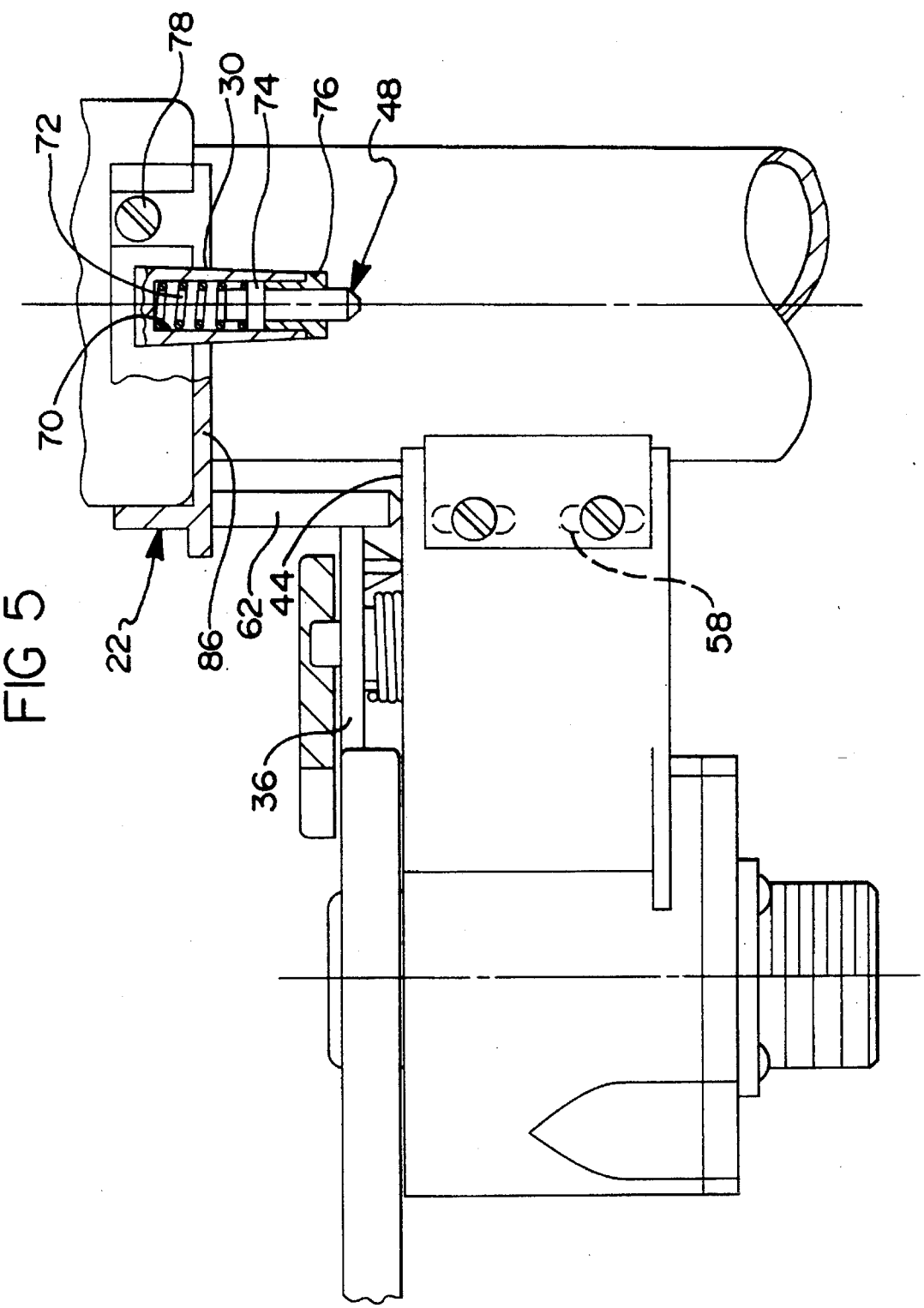

METHOD AND APPARATUS FOR ALIGNING TURN SIGNAL SWITCH

TECHNICAL FIELD

The present invention relates generally to motor vehicle turn signal switches, and more particularly to the alignment of a turn signal switch cancellation mechanism with respect to the switch housing mounted to the steering column housing.

BACKGROUND ART

Turn signal switch assemblies are well-known, and often include a self-cancelling mechanism carried by the steering wheel hub for engagement with an actuator on the turn signal switch assembly. The switch assembly is often rigidly mounted to the exterior of the steering column housing, although some switch cancellation assemblies are mounted interiorly of an exterior housing. However, the interior structures are generally more complicated so as to fit within the housing; and must be supplied as original equipment with the vehicles. In addition, access to such structures is obstructed, and thus substantially increases the labor, expense and time necessary to diagnose or repair problems in the turn signal and cancellation mechanism.

Externally mounted turn signal switch assemblies provide appreciable cost savings by simplicity in the original manufacturing and assembly, as well as in the case of repairing or replacing components of the switch assembly as shown in U.S. Pat. Nos. 4,013,850 and 3,809,833. Both of these patents disclose directional signal assemblies mounted to the steering column housing by a strapping clamp. In the self-cancelling turn signal system of U.S. Pat. No. 4,013,850, a pin rotates with the steering wheel hub so that it passes through a path intersecting a lever arm position on the exterior of the switch housing assembly. Unfortunately, the position of the switch housing along the axis of the steering column is dependent wholly upon the abilities of the installer to estimate a proper alignment and secure the strap clamp in the desired position. Accordingly, the cancellation pin may miss or make only partial contact with the lever. Misalignment may accelerate the wear of the contacting parts, or cause deformation or misalignment of the pin and lever contact point which interferes with proper operation of the turn signal or the cancellation mechanism.

In order to avoid arbitrary alignments of the switch housing with respect to the cancellation mechanism on the hub, attempts have been made to insert gauge blocks that position the lever at a fixed position relative to the rotatable hub that carries the cancellation pin. However, such alignment is extremely laborious and difficult since an operator who has secured a cancellation assembly in position on the hub must hold the switch housing while aligning the housing and also tightening the fastener to attach the switch housing to the steering column housing. Accordingly, an installer finds it difficult to hold and retain another item such as a gauge block between the relatively small surfaces between the hub and the switch housing, particularly where the housing must be properly positioned along an inclined axis of the steering column. In fact, use of alignment gauges would substantially increase the time for installation of the turn signal assembly, particularly if the housing may be initially secured to the steering column housing, then loosened to permit insertion of a gauge between the hub and the actuator. Such loosening or tightening to attempt alignment of the switch housing with respect to the cancellation mechanism carried on the hub can be extremely difficult due to the dashboard spacing, interior layout and other controls at the steering column. In addition, the cancellation pin is generally mounted diametrically away from the switch housing relative to the steering column and cannot contribute to alignment of the pin within the path of the exposed actuator. Moreover, unless the hub is also turned for alignment it would be extremely difficult for a single installer to position the cancellation pin toward the switch housing while holding the housing and tightening the fastener carried at an end of the strap clamp.

SUMMARY OF THE INVENTION

The present invention overcomes the above-mentioned disadvantages by providing a method and apparatus for aligning the turn signal switch assembly, carried by the steering column housing, with the cancellation actuator rotatably carried by the steering wheel hub. In general, a gauge pin is formed with one of the switch mounting components so that a cancellation pin is rotated at a radially extended position for arcuate path registration with an actuator positioned on an exposed surface on the turn signal housing. The present invention simplifies and eases the installation procedures required to properly align the turn signal housing with the cancellation mechanism. Accordingly proper installation of one portion of the apparatus guides alignment of the other portion for immediate, simplified installation.

In the preferred embodiment, a steering wheel hub cancellation bracket body includes a gauge pin extending axially at a radially extended position for arcuate path registration with an actuator to be mounted for support by the steering column. The hub bracket includes an alignment surface, preferably a radially extended annular surface, to abut against a radially extending abutment surface of the hub. Fasteners, for example, self-threading screws or the like, may be used to install the cancellation bracket body to the steering wheel hub and support the cancellation member, preferably in the form of a resiliently protruding pin extending axially along the steering column.

In addition, the preferred embodiment includes turn signal housing mount for supporting the switch assembly housing, and for axially adjusting the position of the housing with respect to the steering column housing while the turn signal switch housing is wholly supported by the steering column housing. Particularly, the turn signal switch housing may be bolted to a bracket secured to the steering column housing. The mount provides support for the turn signal switch housing during installation and alignment of the switch housing. The housing may include a nut in a captured cavity for sliding displacement along the axis of the steering column, the nut having a threaded opening that registers with axially aligned, elongated slots in a wall of the switch housing. Threaded fasteners are inserted to extend through stem-sized openings in a bracket mounted to the steering column housing and into the nut through the wall openings. Alternatively, the steering column bracket may include elongated slots adapted to receive bolt stems, the bolt stems being threaded into apertures formed in the turn signal switch housing. In either event, the turn signal switch housing remains slidably adjustable along the axis of the steering column housing. Moreover, the switch housing is supported by the steering column housing during the alignment with the cancellation mechanism.

As a result, the present invention provides a method for installing and aligning a turn signal cancellation mechanism with a turn signal switch housing in which gauge pins carried by one of the parts is positioned against an exposed surface on the other part. For example, a switch assembly is positioned at a mount in the form of a bracket carried by the steering column housing. The switch assembly has an exposed actuator and a gauge surface adjacent the actuator. An engager, preferably in the form of an arcuate bracket, is secured to the steering wheel hub by positioning an alignment surface against a corresponding abutment surface on the hub and securing the engager to the hub. When the hub bracket includes the removable gauge pin, the turn signal switch housing is axially displaced along the mount in the direction of the steering column axis, while being supported by the mount, until the gauge pin abuts against the gauge surface adjacent the actuator. When the switch housing is positioned by abutment with the gauge pin, the switch assembly housing is secured tightly in position at the mount by complete installation of the fasteners. In the preferred embodiment, the gauge pin is formed in one piece with this bracket, preferably made of a plastic material, so that the gauge pin can be easily clipped for removal from the bracket. When the gauge pin is removed, only the cancellation member remains exposed for contact with the actuator on the turn signal switch housing.

As a result, the present invention provides an advantageous method and apparatus for simplifying and easing installation of a self-cancellation turn signal assembly carried exteriorly of the steering column housing. In addition, the present invention provides more accurate alignment of the turn signal cancellation mechanism by a single installer as it relieves the need to measure or manipulate gauges while mounting the turn signal housing and the cancellation mechanism at the steering column. Moreover, the present invention avoids the tendency of the cancellation housing to change positions along the axis of the steering column when the turn signal housing is not tightly engaged with the mount at the steering column. Moreover, the present invention avoids the opportunity for misalignment of the cancellation pin with respect to an actuator exposed on a turn signal switch housing.

BRIEF DESCRIPTION OF THE DRAWING

The present invention will be more clearly understood by reference to the following detailed description of the preferred embodiment when read in conjunction with the accompanying drawing in which like reference characters refer to like parts throughout the views and in which FIG. 1 is a plan view of a turn signal housing attached to a steering column housing according to the present invention;

FIG. 2 is a bottom view of a steering column carrying a turn signal assembly according to the present invention;

FIG. 3 is an enlarged sectional view of a portion of the device shown in FIG. 1;

FIG. 4 is a sectional view taken substantially along the line 4—4 in FIG. 3; and FIG. 5 is an enlarged view similar to FIG. 2 emphasizing features shown in FIG. 2 and an alternative construction readily applied according to the present invention.

DETAILED DESCRIPTION OF THE PREFERRED EMBODIMENT

Referring first to FIG. 1, a turn signal assembly 10 with self-cancellation includes a turn signal switch assembly housing 12 carried by a steering column housing 14 by mount 16, as well as a cancellation assembly 18 carried by the steering wheel hub 20. Each of these elements may be constructed in conventional manners, for example, as disclosed in U.S. Pat. Nos. 4,013,850 or 4,081,634 incorporated by reference. Of course, additional features particularly pertaining to the present invention will be discussed in detail for the purposes of illustration of features applicable to the present invention.

As best shown in FIG. 1, the cancellation device 18 comprises a ring bracket 22 including an annular, semi-circular ring wall 24, a radially extending annular wall 26 and a reinforcement ring 28. The ring bracket 22 carries a pair of socket bosses 30 at diametrically opposed positions for supporting cancellation pins in a manner to be discussed in detail below.

The turn signal assembly housing 12 carries a pivoted lever 32 for controlling the operation of turn signal switches carried within the housing in a well-known manner. As is also previously known, the housing 12 carries an actuator 34 exposed to registration with a cancellation pin in the arcuate path 35 followed by the cancellation pin carried in the boss 30. The actuator 34, for example, lever 36, pivoted beneath the cover 38, extends between the arms 40 and 42 of lever 32. These parts form a position calibrated turn signal switch. Lever 36 is forced to pivot when engaged by a pin to control the internal turn signal electrical switch. By mechanically engaging arms 40, 42 when the arms are aligned in an actuated position, the handle 32 returns to the position shown in the drawing in a well known manner, to disengage the internal electrical switch.

The actuator 34 is exposed adjacent an engagement surface 44 on the housing 12 so that the actuator 34 intersects with the path 35 of the cancellation pins. The switch housing 12 could be fabricated using thermoplastic materials such as polycarbonate, nylon, polyester, polyphenylene-sulfide, etc., in either reinforced or unreinforced composition. Ferrous materials such as alloy steel, carbon steel, cast iron, stainless steel, etc. could also be used. Nonferrous metals such as aluminum and its alloys, zinc and its alloys, etc. could also be used and the bracket could be of a machined, cast, extruded, sintered, die drawn or molded construction. The lever component could be fabricated using thermoplastics such as polycarbonate, nylon, polyester, etc., in either reinforced or unreinforced composition. Ferrous materials such as alloy steel, carbon steel, cast iron, stainless steel, etc. could also be used. Nonferrous metals, such as aluminum and its alloys, zinc and its alloys, etc. could be used. It could be of a molded, sintered, die cast, die stamped, cold formed or extruded construction. The lever spring component could be any force generating device such as a torsion spring, extension spring, compression spring, wave washer, compressed air or gas actuated plunger, leaf spring, etc.

A bracket 50 is secured to the steering column housing 14, for example, by welds or other fasteners. In the preferred embodiment, the bracket 50 includes the weld mounted base flange and side flanges with openings adapted to receive the stem of bolts 52 in a fixed position.

As best shown in FIGS. 3 and 4, the housing 12 includes a pair of cavities 54 adapted to receive adjustable nuts 56. Each nut 56 includes at least one threaded opening adapted to receive bolt 52 for registration with elongated slots 58 in a side wall of the housing 12 forming a periphery of the cavity 54. The adjustable nut or nuts could be fabricated using ferrous materials such as alloy steel, carbon steel, cast iron, stainless steel, etc. Nonferrous metals such as aluminum and its alloys, zinc and its alloys, copper and its alloys, etc. could also be used. Thermoplastics such as polyphenylene-sulfide, polycarbonate, nylon, etc., in either reinforced or unreinforced composition, could be used. It could be of a machined, die stamped, extruded, sintered or molded construction. Holes to accept screw fasteners could be tapped for threading, or smooth to accept self tapping type fasteners. Other detail, such as slots, could be formed into the part to accept a variety of securement means.

The cavity 54 is closed at one end, for example, a top wall 60 as shown in FIG. 4, and a retainer cap 61 closes the open bottom of the cavity 54. The retainer cap 61 is installed after insertion of the nut to capture the nut 56 within the cavity 54. The cover and other retaining means could be fabricated using thermoplastics such as polycarbonate, nylon, polyester, etc. in either reinforced or unreinforced composition. Ferrous materials such as alloy steel, carbon steel, cast iron, stainless steel, etc., could be used. Nonferrous metals such as aluminum and its alloys, zinc and its alloys, etc. could also be used. These parts could be of molded, extruded, die cast, sintered or die stamped construction. Although the nut is slidable along the axis of the steering column as shown by the directional arrow 63 in FIG. 4, the nut is otherwise restrained from rotation within the cavity by squared or otherwise configured mating surfaces which engage the wall of the housing against the flanges of the bracket 50.

Referring now to FIG. 5, the ring bracket 22 is formed in one piece with a gauge pin 62. The steering wheel hub mounted cancelling mechanism housing could be fabricated using thermoplastics, such as polycarbonate, polyester, nylon, ABS, acetal, etc. in either reinforced or unreinforced composition. Ferrous materials such as alloy steel, carbon steel, cast iron, stainless steel, etc. could also be used. Nonferrous metals such as aluminum and its alloys, zinc and its alloys, etc. could be used. It could be of a molded die cast, sintered, extruded or die drawn construction.

The bracket preferably has two gauge pins positioned at symmetrical intervals with respect to the cancellation pins 48. As shown in cross-section in FIG. 5, boss 30 defines a cavity 70 carrying a spring such as a coil spring 72 pressing against a pin stud 74. The pin stud 74 includes an enlarged head retained within the chamber 70 by a retainer sleeve 76. The pin or pins could be fabricated using thermoplastics such as polycarbonate, nylon, acetal, ABS, etc. in either reinforced or unreinforced composition. Ferrous materials such as alloy steel, carbon steel, cast iron, stainless steel, etc. could also be used. Nonferrous metals such as aluminum and its alloys, zinc and its alloys, copper and its alloys, etc. could be used. The pin or pins could be of molded, cold formed, sintered, die cast, machined or die drawn construction. The pin spring or springs could be any force generating device, such as a compression spring, extension spring, torsion spring, wave washer, compressed air or gas actuated plunger, leaf spring, etc. The retainer or retainers means could be fabricated using thermoplastics such as polycarbonate, nylon, ABS, acetal, polyester, etc., in either reinforced or unreinforced composition. Ferrous materials such as carbon steel, alloy steel, stainless steel, cast iron, etc. could be used. Nonferrous metals such as aluminum and its alloys, zinc and its alloys, etc. could also be used. These parts could be of a molded, extruded, cold formed, die stamped, die drawn, die cast or machined construction.

The turn signal cancellation members then are installed by passing the semi-circular ring 22 over the hub and then axially displacing the ring bracket 22 until the annular wall 26 engages against the abutment surface 86. The ring bracket 22 is secured in position by self-tapping screws 78.

The turn signal switch assembly housing 12 may be supported in a mounting position by the bracket 50 by engagement of the bolts 52 in the openings in the bracket 50 and through the slots 58 in the housing wall into engagement with the nuts 56. As a result, the turn signal housing is supported at an approximate axial position with regard to the cancellation pin 48. As a result, the turn signal housing 12 can be more easily positioned in a proper axial alignment with respect to the cancellation pin 48 by means of the gauge pin 62.

In particular, the housing 12 may be axially displaced as the nuts 56 move in cavities 54. The housing 12 is manipulated to move toward and into abutment with the gauge pin 62 to properly position the exposed engagement surface 44. More particularly, the actuators 34 in the form of lever 36 are then positioned in proper alignment for engagement with the cancellation pin 48. The bolts 52 are then tightened to accurately align and securely position the turn signal housing 12 on the steering column housing 14 in operable positions for engagement with the cancellation pin 48. As a result, the installer does not have to physically support the turn signal housing 12 while simultaneously attempting to fasten the housing to the steering column housing 14 and estimating the alignment required to properly engage the cancellation pins 48 with the actuator 34 exposed above the gauge surface 44.

Having thus described the present invention, many modifications thereto become apparent to those skilled in the art to which it pertains without departing from the scope and spirit of the present invention. For example, an alignment process may also be practiced with elongated slots 58 in the bracket 50, for example, if the slots shown in hidden line in FIGS. 1 and 5 were shown in solid line in that figure. In such a construction, the bolts 52 would fit in threaded apertures within the wall of the housing 12. However, the use of adjustable nuts 56 provides substantially greater support for the housing 12 while it is being supported and aligned for final connection to the steering column housing 14.

We claim:

1. A turn signal switch mount for a motor vehicle steering column rotatably carrying a steering wheel hub, the mount comprising:

a housing carrying a turn signal switch assembly comprising an exposed actuator and having a gauge surface exposed adjacent to said actuator, said housing having a support for securing the housing on the steering column with said gauge surface at a selectively fixed axial position along a column axis;

a cancellation engager secured to a steering hub for rotation with the hub, and having a protrusion mounted for extension at a radially extended position for arcuate registration with said actuator; and a gauge pin removably mounted to one of said housing and said engager to position said gauge surface a predetermined axial distance from said engager, whereby said protrusion registers in abutting contact with the actuator during a rotary displacement with said hub when said gauge pin is removed.

2. The invention as described in claim 1 wherein said gauge pin comprises a plastic peg formed on said engager.

3. The invention as described in claim 2 wherein said gauge pin is formed in one piece with said engager.

4. The invention as described in claim 1 wherein said hub comprises a radial shoulder and wherein said engager has a radial abutment surface.

5. The invention as described in claim 1 wherein said support comprises a walled cavity and a nut slidably received in said cavity.

6. The invention as described in claim 1 wherein said support comprises a bolt and nut adapted to receive a correspondingly threaded fastener, a bracket carried by said column housing and having an axially elongated slot dimensioned to receive said bolt.

7. A method for aligning a turn signal switch assembly carried by a steering column with a switch cancellation engager carried by a steering wheel hub comprising:

positioning said switch assembly at a mount, said switch assembly having an exposed actuator and a gauge surface adjacent said actuator;

retaining said switch assembly in axially displaceable engagement with said mount;

installing said engager on said hub by positioning an alignment surface against a corresponding abutment on said hub and securing the engager to the hub in said position;

positioning a removable gauge pin on said engager in radial registration with the gauge surface by said installing said engager;

axially displacing said switch assembly to abut against said gauge pin at said gauge surface;

securing said switch assembly tightly against said column housing in said abutting position; and removing said gauge pin.

8. The invention as described in claim 7 wherein said removing step comprises clipping said gauge pin.

9. A turn signal switch mount for a motor vehicle steering column rotatably carrying a steering wheel hub, the mount comprising;

a housing carrying a turn signal switch assembly comprising an exposed actuator and having a gauge surface exposed adjacent to said actuator, said housing having a support for securing the housing on the steering column with said gauge surface at a selectively fixed axial position along a column axis;

a cancellation engager secured to a steering hub for rotation with the hub, and having a protrusion mounted for extension at a radially extended position for arcuate registration with said actuator; and a gauge pin removably mounted to one of said housing and said engager to position said gauge surface a predetermined distance from said engager, whereby said protrusion registers in abutting contact with the actuator during a rotary displacement with said hub when said gauge pin is removed;

wherein said gauge pin comprises a plastic peg formed on said engager; and said gauge pin is formed in one piece with said engager.

10. A turn signal switch mount for a motor vehicle steering column rotatably carrying a steering wheel hub, the mount comprising;

a housing carrying a turn signal switch assembly comprising an exposed actuator and having a gauge surface exposed adjacent to said actuator, said housing having a support for securing the housing on the steering column with said gauge surface at a selectively fixed axial position along a column axis;

a cancellation engager secured to a steering hub for rotation with the hub, and having a protrusion mounted for extension at a radially extended position for arcuate registration with said actuator; and a gauge pin removably mounted to one of said housing and said engager to position said gauge surface a predetermined distance from said engager, whereby said protrusion registers in abutting contact with the actuator during a rotary displacement with said hub when said gauge pin is removed;

wherein said support comprises a walled cavity and a nut slidably received in said cavity.

11. The invention as described in claim 10 wherein said nut includes a threaded opening and a peripheral wall of said cavity includes an elongated slot in registration with said opening.

12. A turn signal switch mount for a motor vehicle steering column rotatably carrying a steering wheel hub, the mount comprising;

a housing carrying a turn signal switch assembly comprising an exposed actuator and having a gauge surface exposed adjacent to said actuator, said housing having a support for securing the housing on the steering column with said gauge surface at a selectively fixed axial position along a column axis;

a cancellation engager secured to a steering hub for rotation with the hub, and having a protrusion mounted for extension at a radially extended position for arcuate registration with said actuator; and a gauge pin removably mounted to one of said housing and said engager to position said gauge surface a predetermined distance from said engager, whereby said protrusion registers in abutting contact with the actuator during a rotary displacement with said hub when said gauge pin is removed; and wherein said support comprises a bolt and nut adapted to receive a correspondingly threaded fastener, a bracket carried by said column housing and having an axially elongated slot dimensioned to receive said bolt.

\* \* \* \* \*